United States Patent
Lyons et al.

[11] Patent Number: 5,986,758
[45] Date of Patent: Nov. 16, 1999

[54] DIFFRACTIVE OPTIC IMAGE SPECTROMETER (DOIS)

[75] Inventors: Denise M. Lyons, Orlando, Fla.; Kevin J. Whitcomb, Canastota, N.Y.

[73] Assignee: The United States of America as represented by the Secretary of the Air Force, Washington, D.C.

[21] Appl. No.: 09/136,116

[22] Filed: Aug. 18, 1998

[51] Int. Cl.[6] .................................................. G01J 3/28
[52] U.S. Cl. ............................................ 356/326; 356/332
[58] Field of Search .................................... 356/326, 328, 356/331, 332, 334

[56] References Cited

U.S. PATENT DOCUMENTS 5,479,258  12/1995  Hinnrichs et al. ...................... 356/326

*Primary Examiner*—F. L. Evans
*Attorney, Agent, or Firm*—Harold L. Burstyn

[57] ABSTRACT

An imaging spectrometer provides a three-dimensional (two (2) spatial and one (1) spectral) image cube of a target. In this apparatus, a diffractive optical element (DOE) performs the imaging and provides the dispersion necessary to separate a multi-spectral target into separate spectral images that are detected by a photodetector array. A lens (or set of lenses) relays the image formed by the DOE to the photodetector array. This lens allows the DOE and photodetector array to be mounted with a fixed separation and the spectral images to have a constant magnification. The lens is stepped or scanned along the optical axis, and each position of the lens corresponds to a particular wavelength being imaged onto the photodetector array. At each position of the relay lens the photodetector array records a spectral image by a process called diffractive spectral sectioning.

10 Claims, 5 Drawing Sheets

DIFFRACTIVE OPTIC IMAGE SPECTROMETER (DOIS)

STATEMENT OF GOVERNMENT INTEREST

The invention described herein may be manufactured and used by or for the Government for governmental purposes without the payment of any royalty thereon.

BACKGROUND OF THE INVENTION

The present invention relates to a spectrometer, and, in particular, to a spectrometer that analyzes the spectrum of light emanating from one or more targets within an image.

U.S. Pat. No. 5,479,258 issued Dec. 26, 1995, to Hinnrichs discloses a spectrometer comprising a diffractive lens, a planar array of photodetector elements (pixels), means for changing the distance between the photodetector array and the diffractive lens along the optical axis, and a signal processor. If either the photodetector array or the lens is moved along the optical axis, different wavelengths of light come into and out of focus on the photodetector array, thereby generating sequential images that correspond to different wavelengths. The spectral composition of a target can be determined from the output of the photodetector array as a function of the position of the diffractive lens relative to the array. Targets have a fine spectral signature that is easily differentiated from the background (non-target) radiation, which generally appears as broad-spectrum white light. Processing to eliminate this background radiation may enhance the sequential images from the array of photodetector elements. Each target's spectrum is built up from sequential images and can be compared to a library of known target signatures.

The basis for Hinnrichs' design is the inherent chromatic aberration of a diffractive lens. The principal shortcoming of such a design is that the magnification is different for each wavelength in the recorded spectra. This shortcoming creates problems in image registration, provides inaccurate relative spectral signal strength, and yields an image space defined by shift variant transfer/imaging theory, thereby requiring complex and computationally intensive calculations.

Problems can arise with this prior-art technique. Resampling the detected image cube requires averaging a non-integral number of pixels, causing edges to blur and pixels to register inaccurately.

Thus there exists a need for a spectrometer with a more accurate optical method of obtaining an image cube with constant magnification.

SUMMARY OF THE INVENTION

Therefore one object of the present invention is to provide a spectrometer that overcomes the drawbacks of the prior art.

Another object of the present invention is to provide an imaging spectrometer that offers spectral imaging with constant magnification.

Briefly stated, the present invention provides an imaging spectrometer with a three-dimensional (two (2) spatial and one (1) spectral) image cube of a target. In this apparatus, a diffractive optical element ("DOE") performs the imaging and provides the dispersion necessary to separate a multi-spectral target into separate spectral images that are detected by a photodetector array. A lens (or set of lenses) relays the image formed by the DOE to the photodetector array. This lens allows the DOE and photodetector array to be mounted with a fixed separation and the spectral images to have a constant magnification. The lens is stepped or scanned along the optical axis, and each position of the lens corresponds to a particular wavelength being imaged onto the photodetector array. At each position of the relay lens the photodetector array records a spectral image by a process called diffractive spectral sectioning.

According to an embodiment of the invention, apparatus for measuring the spectral composition of an image, comprises: a diffractive element for dispersing spectral components of at least one image and directing the spectral components into a volume having a cross-sectional area A and a length L; a photodetector array comprising a substantially planar surface; the surface having a plurality of discrete light detectors deployed thereupon; the photodetector array having an area substantially equal to A; at least one lens for bringing at least one appropriate wavelength of light to focus on the photodetector array; the at least one lens having a cross-sectional area substantially equal to A; means for changing tile distance between the lens with respect to the photodetector array in the direction of L; means for measuring and storing the distance between the diffractive element and the photodetector array; and means for measuring and storing the intensity of spectral components of the image.

According to a feature of the invention, a method of measuring a spatial image and a spectrum of an object, comprises the steps of: aiming at the object a spectrometer that comprises at least one lens, a diffractive element, and a photodetector array; choosing at least one wavelength of interest; adjusting the at least one lens to locations determined, in relation to the object, by the step of choosing; and measuring the spatial image and the spectrum on the photodetector array.

These and many other objects and advantages of the present invention will be readily apparent to one skilled in the pertinent art from the following detailed description of a preferred embodiment of the invention and the related drawings, in which like reference numerals designate the same elements.

DESCRIPTION OF THE PREFERRED EMBODIMENT

Figure 1:
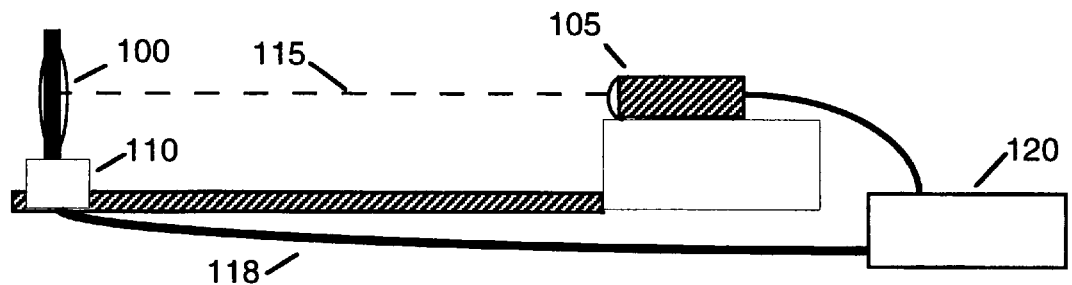
FIG. 1 is a diagram of a three-dimensional spectral imaging spectrometer with a diffractive optical element (DOE) from the prior art.
Figure 2:
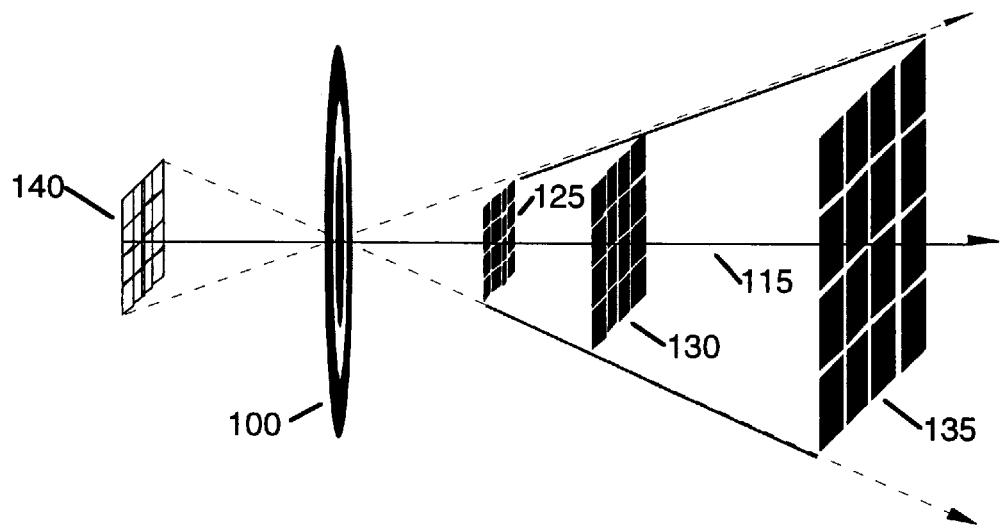
FIG. 2 is a perspective view of the images formed by the apparatus of FIG. 1.

Referring to FIGS. 1 and 2, Hinnrichs teaches an apparatus comprising a diffractive lens 100, a planar photodetector array 105 (e.g., a CCD camera), a motion controlled lens mount 110 for changing and measuring the distance between photodetector array 105 and diffractive lens 100 along an optical axis 115, and a signal processor 120 for controlling and storing the location of motion-controlled lens mount 110, measuring and storing the intensities detected by photodetector array 105, and performing image processing based on these measurements. A connector 118 transfers signals between lens mount 110 and signal processor 120. If either photodetector array 105 or lens 100 is moved along optical axis 115, different wavelengths of light from each target within the image come into and out of focus on particular photodetector elements in the plane of photodetector array 105, thereby generating sequential images 125, 130, 135, each corresponding to a different wavelength. Sequential images 125, 130, 135 are merely three representative discrete images from a continuum of images generated as photodetector array 105 is moved along optical axis 115. The spectral composition of a target 140 within the image can be determined from the output of photodetector array 105 as a function of the position of lens 100 relative to the elements of photodetector array 105. Each target 140 has a fine spectral signature that is easily differentiated from the background (non-target) radiation, which appears as broad-spectrum white light. Signal processor 120 can enhance sequential images 125, 130, 135 to eliminate the background radiation. The spectrum of each target 140 is built up from sequential images 125, 130, 135 and can be compared with a library of known target signatures.

This design is based on the chromatic aberration inherent in diffractive lens 100. Equation 1 shows that a lens with a design focal length $f_o$ at a design wavelength $\lambda_o$ has a focal length that varies with wavelength.

$$f_{DOE}(\lambda) = \frac{f_o \lambda_o}{\lambda} \quad (1)$$

Therefore, according to the first-order imaging equation, $$\frac{1}{f_{DOE}(\lambda)} = \frac{1}{S_o} + \frac{1}{S_{i_{DOE}}(\lambda)} \quad (2)$$

For a fixed target (object) distance, changes in image distance (i.e., movement of photodetector array 105) change the wavelength that is in focus. The same is true if the lens is scanned. But scanning, by changing simultaneously both the object and the image distance, makes the calculations extremely complex.

Combining equations 1 and 2 yields the wavelength of the image currently in focus based on the design parameters of diffractive lens 100, the known distance to the target (object distance), and the measured image distance.

$$\lambda = \lambda_o f_o \left( \frac{1}{S_{i_{DOE}}} + \frac{1}{S_o} \right) \quad (3)$$

The principal shortcoming of the Hinnrichs design is that the magnification between the object plane and image plane is different for each wavelength in the recorded spectra.

$$m_{DOE}(\lambda) = \frac{S_{i_{DOE}}(\lambda)}{S_o} \quad (4)$$

This difference creates problems in pixel registration, provides inaccurate relative spectral signal strength, and yields an image space defined by shift variant transfer/imaging theory.

The present invention provides improved performance by performing diffractive spectral imaging with constant magnification that can be described by shift invariant transfer theory.

The sample data set in Table 1 illustrates the current design and the magnification problem. Diffractive lens 100 in this experiment had a focal length of 20 cm at a wavelength of 588 nm. A panchromatic CCD camera served as photodetector array 105. It was mounted parallel to diffractive lens 100 and stepped along optical axis 115, y, z. Each location z along optical axis 115 corresponds to a specific spectral channel of the image of target 140. Table 1 shows the calculated image distance $z_i$ and magnifications for particular spectral slices of an object located $2f_o$ from lens 100, where $f_o$ is the focal length at the design wavelength $\lambda_o$. The camera that served as photodetector array 105 was connected to a computer that served as signal processor 120 for image capture, analysis, display, and post detection processing. At each step along optical axis 115, an image was recorded along with the location of photodetector array 105. Since the magnification changes with wavelength and the size of photodetector array 105 is fixed, the images are recorded with non-uniform sampling. This creates problems in registering information between spectral slices and limits the accuracy of image reconstruction algorithms.

TABLE 1

The spectral image distances $z_i$ and magnifications for an object at $z_o = 2f_o$.

| 1 [nm] | $z_i$ | $M_{Transverse}$ | $M_{Longitudinal}$ |
| --- | --- | --- | --- |
| 650 | 1.7 $f_o$ | 0.83 | 0.68 |
| 600 | 1.9 $f_o$ | 0.96 | 0.92 |
| 588 | 2.0 $f_o$ | 1.00 | 1.00 |
| 550 | 2.3 $f_o$ | 1.15 | 1.32 |
| 500 | 2.9 $f_o$ | 1.43 | 2.04 |
| 450 | 3.8 $f_o$ | 1.88 | 3.55 |
| 400 | 5.5 $f_o$ | 2.77 | 7.69 |

Post-detection image resampling

Figure 3:
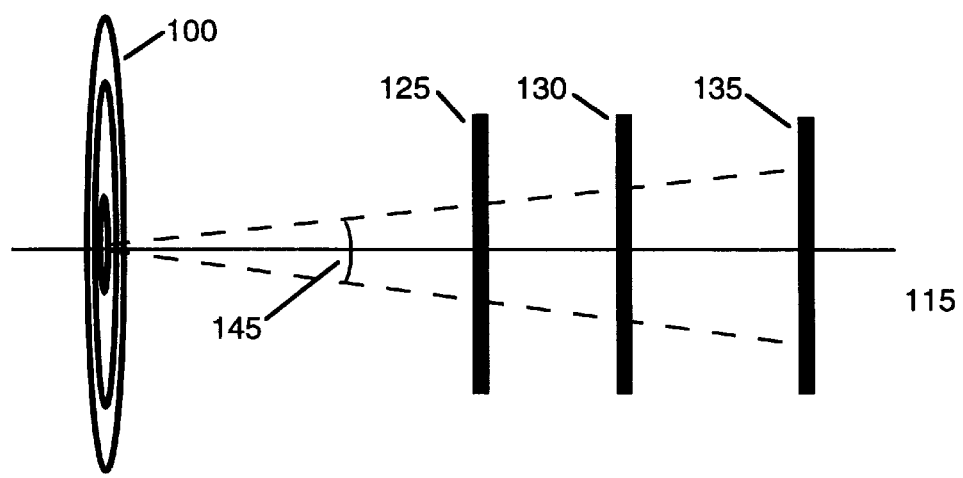
FIG. 3 is a diagram showing how pixel footprints are determined for resampling images in the prior art.

To compensate for the changing magnification, the image cube can be resampled to approximate constant magnification. Referring to FIG. 3, a pixel footprint 145 is defined as the angle subtended at the smallest magnification. This angle can be rewritten as the area subtended in each sequential image 125, 130, 135 divided by the square of the location on optical axis 115. Each sequential image 125, 130, 135 is then resampled by integrating over pixel footprint 145.

$$\Omega_{pixel} = \frac{A_{pixel}}{z_{smallest}^2} \quad (5)$$

$$\Omega_{pixel} = \frac{A_{pixel}}{z_1^2} = \frac{\text{integration area}}{z_2^2} \quad (6)$$

To form a constant magnification image cube with each sequential image 125, 130, 135 having 256×256 spatial pixels, the image at z=20 cm is recorded with 256×256 and the image at z=30 cm will need to be recorded with 384×384 pixels, then interpolated to fit according to the equations below.

$$\Omega_{pixel} = \frac{10 \, \mu m \times 10 \, \mu m}{20 \, cm^2} = \frac{\text{integration area}}{30 \, cm^2} \quad (7)$$

$$\text{integration area} = 225 \, \mu m^2 = 1.5 \text{ pixels} \quad (8)$$

Problems arise with this technique. Resampling the detected image cube requires averaging a non-integral number of pixels. This averaging causes blurring of edges and inaccurate pixel registration. The present invention is a more accurate optical method of obtaining an image cube with constant magnification. Optical design for diffractive spectral imaging with constant magnification.

Figure 4:
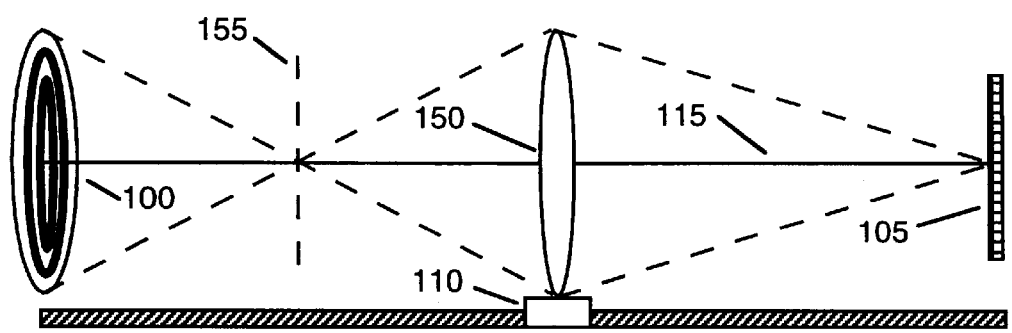
FIG. 4 is a diagram of the optical system of the present invention showing the additional relay lens and image locations.

Referring to FIG. 4, a second approach to DOIS imaging with constant magnification is a redesigned optical train. A refractive relay lens 150 is added between diffractive lens 100 and photodetector array 105 to relay and magnify images from diffractive lens 100. Refractive relay lens 150 is now on motion-controlled lens mount 110 instead of diffractive lens 100, since diffractive lens 100 remains in a fixed position. Relay lens 150 is scanned using motion-controlled lens mount 110, and its position dictates the spectrum of the sequential images 125, 130, 135. This addition provides an additional degree of freedom, eliminating either changes in image location or changes in magnification.

Referring again to FIG. 4, the total tube length or optical train length, $T_o$, is defined as the distance between diffractive lens 100 and photodetector array 105 and is held constant. Diffractive lens 100 still performs the dispersion and forms sequential images 125, 130, 135. However, relay lens 150 is placed after the image space of diffractive lens 100 relaying sequential images 125, 130, 135 to photodetector array 105. The images formed by relay lens 150 on photodetector array 105 will be erect, and the spectra will depend on the position of relay lens 150, d, and object distance of target 140, $s_o$.

Combining the first-order imaging equation for relay lens 150

$$\frac{1}{f} = \frac{1}{S_{o_1}} + \frac{1}{S_{i_1}} \quad (9)$$

with the following expression for T' defined as the sum of the object distance (the length from a diffractive lens image 155 to relay lens 150) and image distance (the distance from relay lens 150 to photodetector array 105) for relay lens 150, $$T' = S_{o_1} + S_{i_1} \quad (10)$$

yields the following quadratic equation for finding $S_{o1}$.

$$S_{o_1}^2 - T' S_{o_1} + fT' = 0 \quad (11)$$

Combining the solutions to equation 11 with the image distance from diffractive lens 100, $S_{i_{DOE}}$, gives the locations for relay lens 150 that properly image the wavelength λ.

$$d = S_{i_{DOE}} + S_{o_1} \quad (12)$$

The overall magnification of the system is given by, $$M = m_{DOE} m_{lens} = \frac{S_{i_{DOE}}}{S_o} \frac{S_{i_1}}{S_{o_1}} \quad (13)$$

Note that the magnification of diffractive lens 100, $m_{DOE}$, is still a function of wavelength. Likewise, since T' is also a function of wavelegth, the image and object distances for relay lens 150, and therefore the magnification for relay lens 150, will change as the spectrum is scanned.

Figure 5:
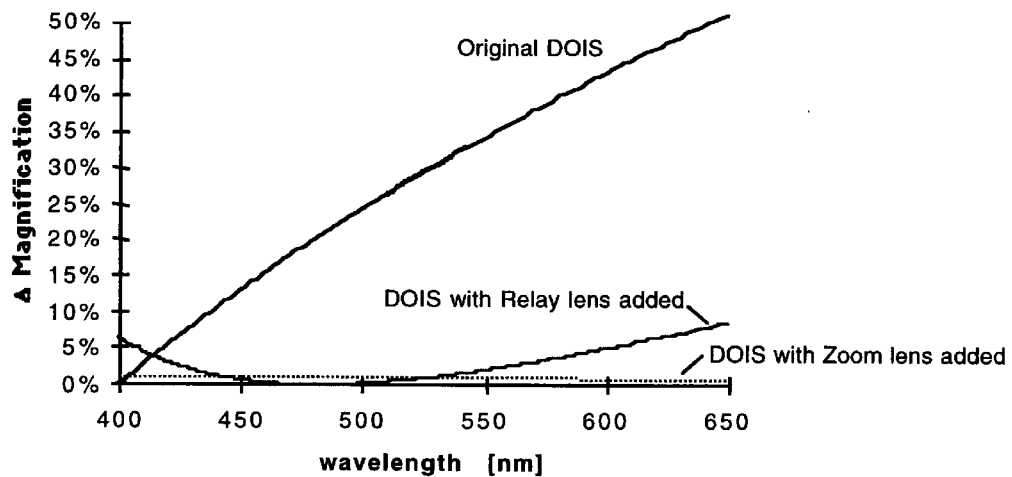
FIG. 5 is a graph comparing the change in magnification with wavelength in the prior art to the systems shown in FIGS. 4 and 6.

Referring to FIG. 5, although the two magnifications do not cancel each other out, the change over the entire spectral band is reduced substantially, to less than 10%.

Figure 6:
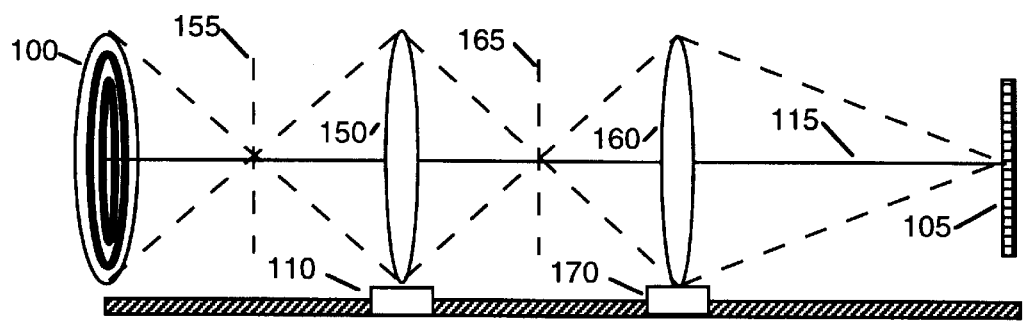
FIG. 6 is a diagram of the improved optical system of the present invention, including two relay lenses as well as image locations.

To further improve the changing magnification, relay lens 150 can be replaced with a pair of lenses that form a zoom lens, as shown in FIG. 6.

The constant magnification of the zoom lens is shown as a dotted line in FIG. 5. Adding a second relay lens 160 whose position is controlled by a second motion-controlled lens mount 170 (see FIG. 6) gives another degree of freedom, thereby eliminating the changes in both magnification and image location.

The following equation is added to take into account the constant magnification, $$M'(\lambda) = \frac{M_o}{m_{DOE}(\lambda)} \quad (14)$$

where M' represents the magnification for the optical train represented by T' (which starts at the image distance of diffractive lens 100 and ends at photodetector array 105). When M' is multiplied by $m_{DOE}$, it should always yield $M_o$, the desired overall magnification.

An evaluation similar to the single lens case will produce a quadratic equation for the distance $d_2$. Borrowing equations from Warren Smith's Lens Design book and adapting the notation to the convention above, the following equations for $d_2$ (the separation between relay lens 150 and second relay lens 160) and $S_{o1}$ are obtained.

$$d_2^2 - d_2 T' + T'(f_1 + f_2) + \frac{(M'-1)^2 f_1 f_2}{M'} = 0 \quad (15)$$

$$S_{o_1} = \frac{(M'-1)d_2 + T'}{(M'-1) - \frac{M'd_2}{f_1}} \quad (16)$$

Note that, $$d_1 = S_{i_{DOE}} + S_{o_1} \quad (17)$$

Thus, for a given wavelength, λ, there is a set of solutions $d_1$ and $d_2$, given the design parameters of diffractive lens 100, the distance to target 140, $S_o$, the focal lengths of relay lens 150 and second relay lens 160, $f_o$ & $f_1$, the overall tube length, $T_o$, and the overall magnification, $M_o$.

Figure 7:
FIG. 7 is a ray-trace diagram generated by optical design software showing the relay lens locations to properly focus an image of 700 nanometer (nm) light.
Figure 8:
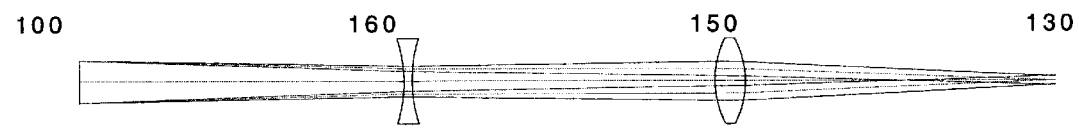
FIG. 8 is a ray-trace diagram generated by optical design software showing the relay lens locations to properly focus an image of 550 nanometer (nm) light.
Figure 9:
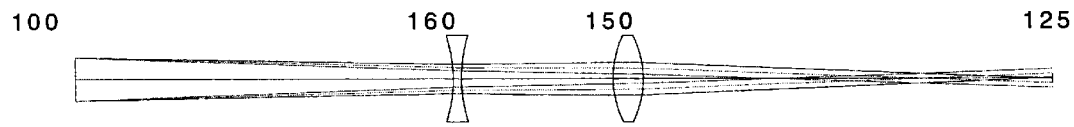
FIG. 9 is a ray-trace diagram generated by optical design software showing the relay lens locations to properly focus an image of 400 nanometer (nm) light.

FIGS. 7, 8, and 9 show ray trace diagrams for the two-lens design from the optical design program ZEMAX. The wavelengths shown are 700, 550, and 400 nm, corresponding respectively to sequential images 125, 130, and 135. Diffractive lens 100 was modeled as a holographic lens with a focal length of 20 cm at a design wavelength of 588 nm. Relay lens 150 (Newport KBC079) was a bi-concave lens with a focal length of −150 mm, and second relay lens 160 (Newport KBX154) was a bi-convex lens with a focal length of 100 mm. The overall tube length is 30 cm, the target distance is 1.7 m, and the overall magnification is 0.1.

Table 2 below shows in mm the actual separations of the lenses for each wavelength of interest. D1 is the distance from diffractive lens 100 to relay lens 150; D2, from relay lens 150 to second relay lens 160; and D3 is the optical path from second relay lens 160 to photodetector array 115.

TABLE 2

ZEMAX distances (mm) for FIG. 7 ray traces.

|     | D1     | D2     | D3     |
| --- | ------ | ------ | ------ |
| 400 | 115.80 | 46.79  | 125.46 |
| 550 | 99.67  | 94.06  | 94.33  |
| 700 | 66.12  | 143.46 | 78.48  |

The DOIS of the present invention has several advantages over current image spectrometers. It incorporates a simple one-axis translation on a rugged platform, making it insensitive to vibrations that limit Fourier Transform spectrometers. DOIS is programmable, providing single spectra and narrowband or full spectrum image cubes. It can provide coarse or fine spectral resolution by choosing the stepping increment and an object reconstruction algorithm at various levels of computational expense.

The DOIS of the present invention uses mainly off-the-shelf components. The DOE fabrication does have a large first-time expense to generate a master; however, multiple copies can be replicated at minimal expense. The design is not limited by the availability of materials like conventional thin-film spectral filters. Once built for a first application, additional wavelengths within a wide spectral range can be viewed for other applications without changing components.

The DOIS of the present invention solves a common problem associated with spectral filters: the central wavelength of a filter's bandpass can shift due to environmental factors such as temperature. This shift can be corrected with a simple change in position, making on-board calibration and realignment possible.

The DOIS of the present invention provides enough spectral and spatial image quality without post-detection processing to service applications where the recorded image cube can represent the target. Unlike approaches from computer-tomography, the pre-processed images from the present invention are at least recognizable, so the operator can have confidence while recording the data. This is true even when it is necessary to reconstruct the object.

DOIS spectrometry can be added to existing camera systems with a simple lens/mount replacement, providing additional information for the difficult task of identifying a target. DOIS can also be a cost-effective solution to spectroscopy where imaging isn't required but would help. The imaging can minimize misalignment and improve tracking of moving targets. The additional pixels within the field of view can be simultaneous data measurements averaged to improve accuracy and reduce noise.

As with most imaging spectrometers, the scanning mechanism limits use in applications with short lifetimes. However, in the alternative, a DOIS system of the present invention can be designed with no moving parts, recording the entire image cube in a single "snapshot".

Alternative embodiments provide diffractive optic image spectrometry with constant magnification. Dual Waveband design using multiple orders With a two-level zone plate as diffractive lens 100, five separate diffractive orders are observed by scanning photodetector array 115 closer to diffractive lens 100. Each order is located at $$\frac{f}{m},$$

where f is the focal length of the first diffractive order and m is the diffractive order number. Viewing wideband-emitting targets causes the orders to superimpose on one another. This effect can be adapted to design a multi-band spectral imager, where diffractive lens 100 images far-IR radiation in the first order and mid-IR in the second order.

Figure 10:
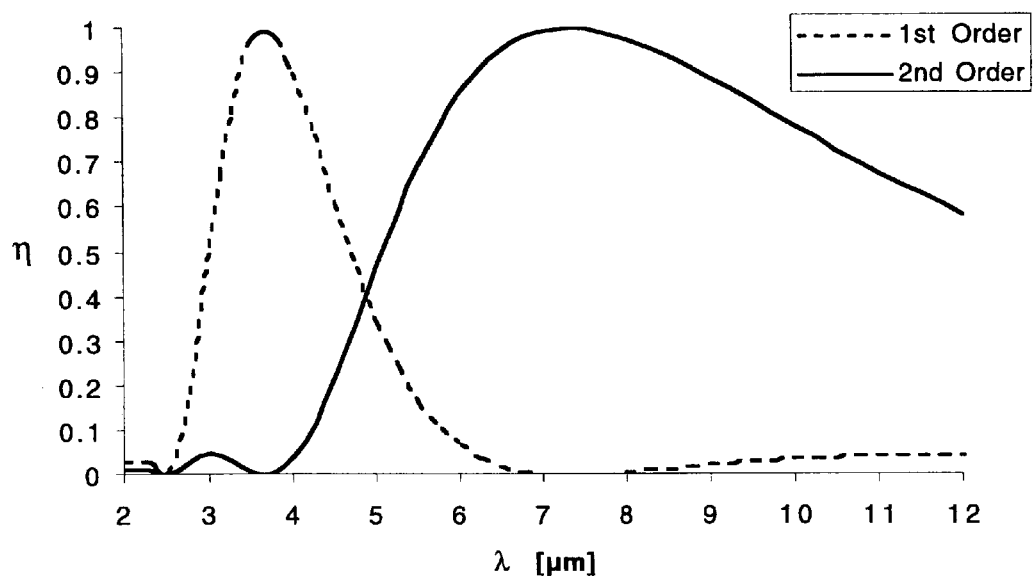
FIG. 10 is a graph showing the diffraction efficiency of the 1$^{st}$ and 2$^{nd}$ diffractive orders used as an example of the dual waveband embodiment.

A 16-level DOE designed at $\lambda_d = 7.3\,\mu$m images 8 to 12 $\mu$m far-IR radiation in its first order and 3 to 5 $\mu$m mid-IR in its second diffractive order. FIG. 10 shows the $1^{st}$ and $2^{nd}$ order spectral diffraction efficiency for a $\lambda_d = 7.3\,\mu$m DOE. One can think of various detector configurations, as well as an array of both mid and far IR detectors.

This multi-order concept was demonstrated with the DOIS visible prototype. The second-order image of a 633 nm HeNe laser came to focus at the same plane as the third-order image of a 422 nm monochrometer slit.

Clearly many modifications and variations of the present invention are possible in light of the above teachings. It should therefore be understood that, within the scope of the inventive concept, the invention may be practiced otherwise than as specifically claimed.

What is claimed is:

1. Apparatus for measuring the spectral composition of an image, comprising:

a diffractive element for dispersing spectral components of at least one image and directing said spectral components into a volume having a cross-sectional area A and a length L;

a photodetector array comprising a substantially planar surface;

said surface having a plurality of discrete light detectors deployed thereupon;

said photodetector array having an area substantially equal to A;

at least one lens for bringing at least one appropriate wavelength of light to focus on said photodetector array;

said at least one lens having a cross-sectional area substantially equal to A;

means for changing the distance between said lens with respect to said photodetector array in the direction of L;

means for measuring and storing the distance between said diffractive element and said photodetector array; and means for measuring and storing the intensity of spectral components of said image.

2. Apparatus as in claim 1, wherein said at least one lens is two lenses.

3. Apparatus as in claim 1, wherein said at least one lens is a plurality of lenses.

4. Apparatus as in claim 1, wherein said at least one image is a single image.

5. Apparatus as in claim 1, wherein said at least one image is two images.

6. Apparatus as in claim 1, wherein said photodetector array is effective for detecting two wavelengths simultaneously.

7. A method of measuring a spatial image and a spectrum of an object, comprising the steps of:

aiming at said object a spectrometer that comprises at least one lens, a diffractive element, and a photodetector array;

choosing at least one wavelength of interest;

adjusting said at least one lens to locations determined, in relation to said object, by said step of choosing; and measuring said spatial image and said spectrum on said photodetector array.

8. The method of claim 7, wherein each of said steps of aiming and measuring includes an additional step of holding said photodetector array stationary.

9. The method of claim 7, wherein said step of adjusting includes two lenses.

10. The method of claim 7, wherein said step of measuring is effective for measuring two wavelengths simultaneously.

* * * * *